Jan. 1, 1952 R. W. BAILEY 2,580,379
INTERLEAVING APPARATUS
Filed Dec. 29, 1945 4 Sheets-Sheet 2

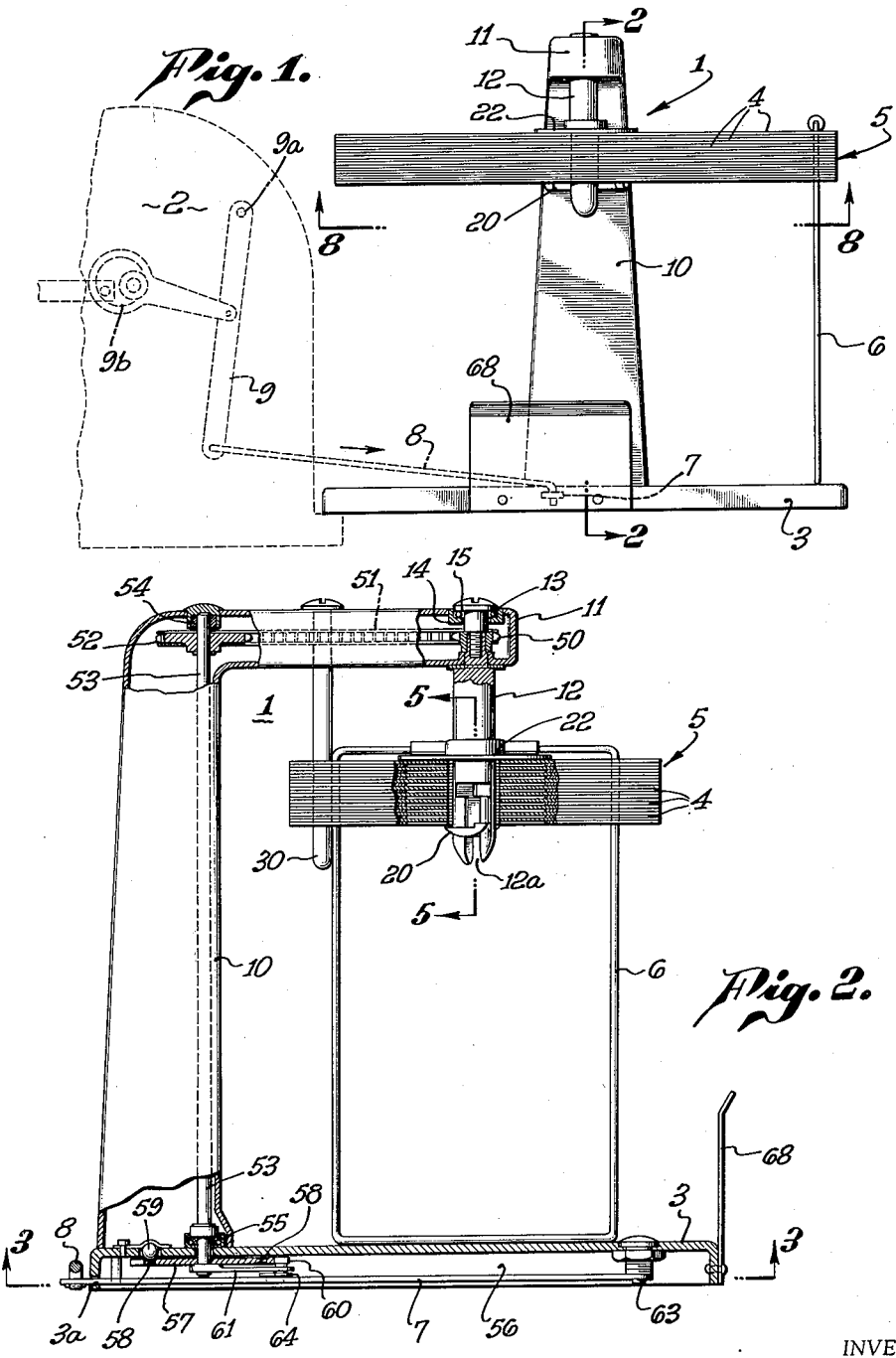

INVENTOR
Richard W. Bailey
BY
ATTORNEY

Jan. 1, 1952 R. W. BAILEY 2,580,379
INTERLEAVING APPARATUS
Filed Dec. 29, 1945 4 Sheets-Sheet 3
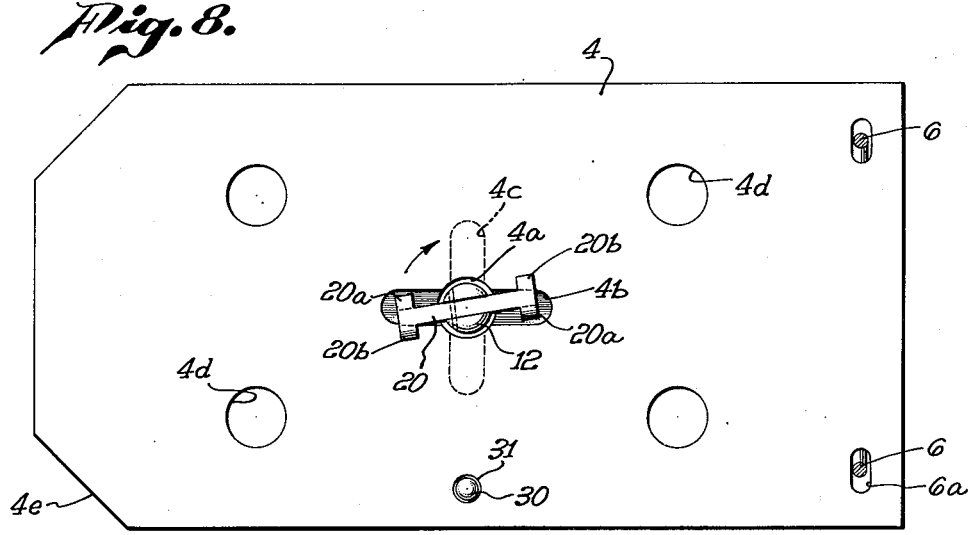
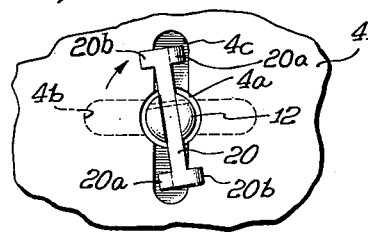
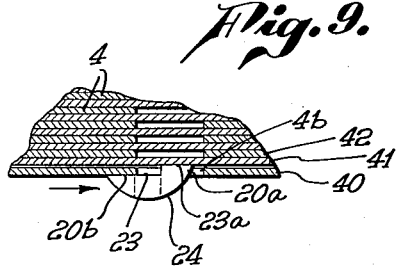
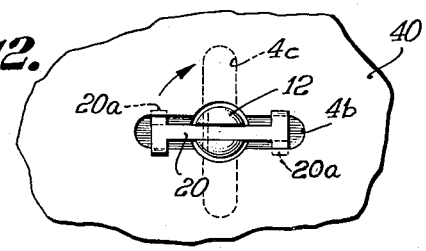
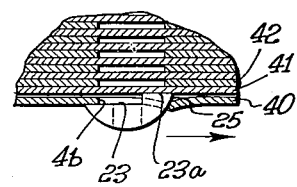
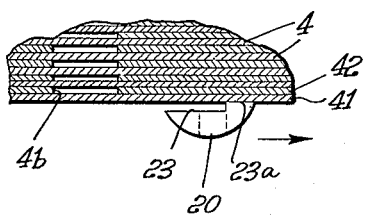
INVENTOR
Richard W. Bailey
BY
ATTORNEY

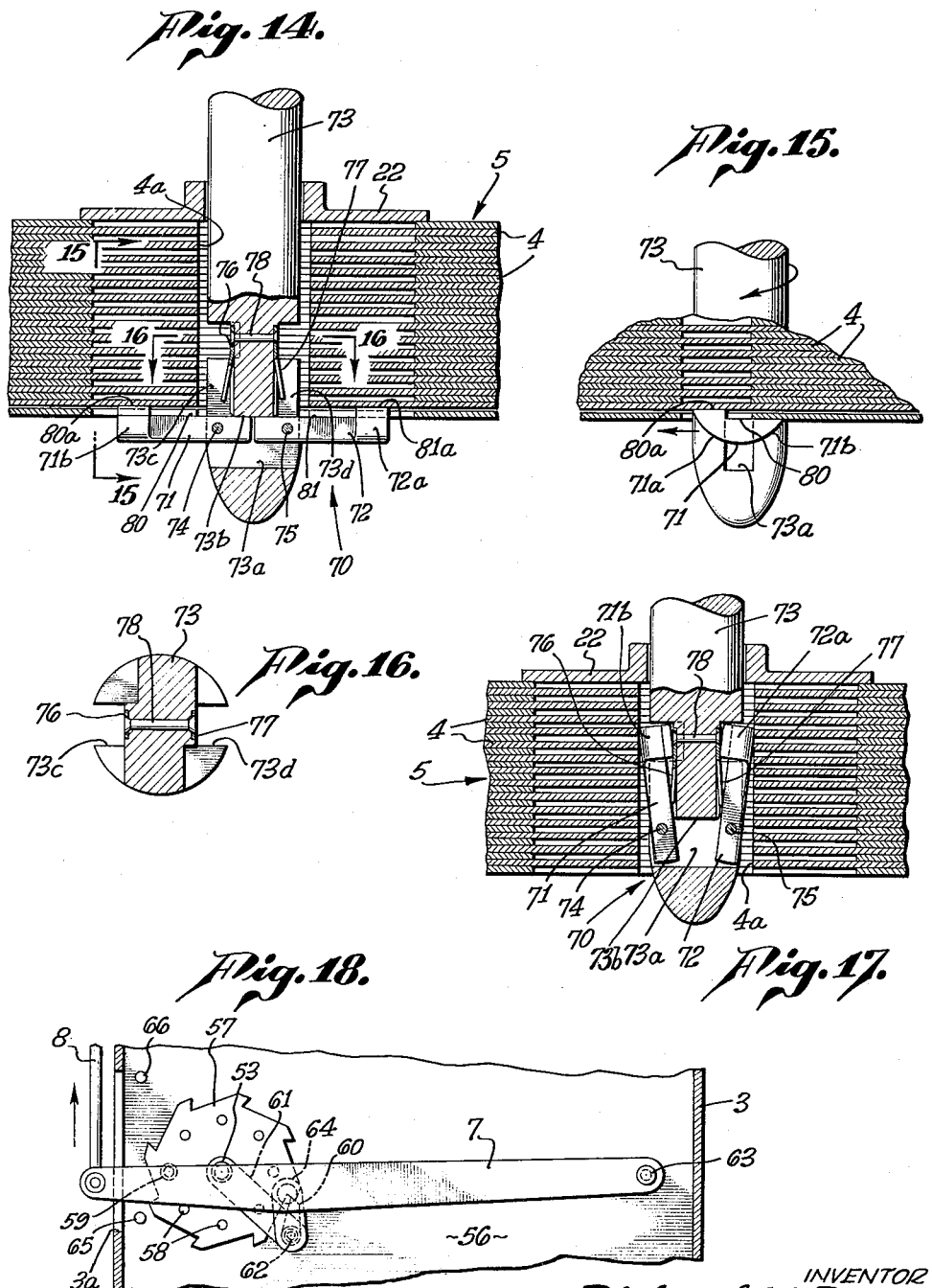

Patented Jan. 1, 1952

2,580,379

UNITED STATES PATENT OFFICE 2,580,379

INTERLEAVING APPARATUS

Richard W. Bailey, Los Angeles, Calif., assignor to Milo M. Harding, Los Angeles, Calif.

Application December 29, 1945, Serial No. 638,222

4 Claims. (Cl. 101—419)

1

This invention relates to interleaving apparatus for use with mimeographs, printing presses, or other duplicating machines.

It is known to provide aparatus for inserting sheets of suitable material between successive freshly printed pages or leaves as they are delivered by duplicating apparatus for preventing blurring, smearing and the like of the printed matter, as well as to prevent any transfer of such matter to the back of the succeeding page. It is an object of this invention to improve and simplify such apparatus.

It is another object of this invention to provide interleaving apparatus capable of successful operation at a higher speed than heretofore practicable.

It is preferred that the slip sheets be allowed to drop on the freshly printed sheets, and for this purpose the sheets are sometimes supported above the printed sheets and released one by one to fall by gravity. It is another object of this invention to provide improved supporting means for this purpose, as well as an improved sheet for cooperating therewith.

It is another object of this invention to provide support means for the sheets which exerts a snap action on the sheets as they are released, to accelerate the downward movement of the sheet.

It is another object of this invention to provide means for guiding the sheet which does not substantially impede the free downward movement thereof.

It is still another object of this invention to provide interleaving apparatus having improved support means for the group or stack of slip sheets, which facilitates the loading of the book thereon.

This invention possesses many other advantages and has other objects which may be made more easily apparent from a consideration of several embodiments of the invention. For this purpose two forms are shown in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the drawings:

Figure 1 is a side elevation of apparatus incorporating the features of the invention;

Figure 2 is a cross section, on an enlarged scale, taken substantially as indicated by line 2—2 on Figure 1;

2

Figure 3:
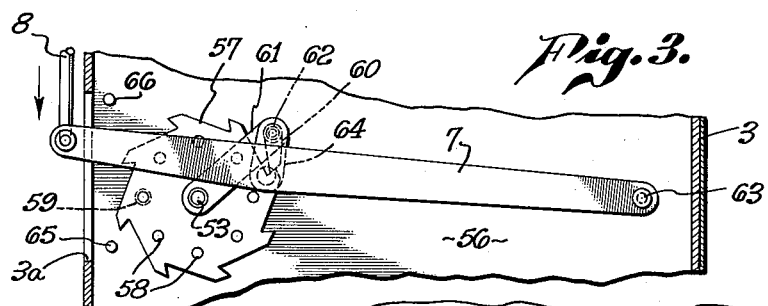
Figure 4:
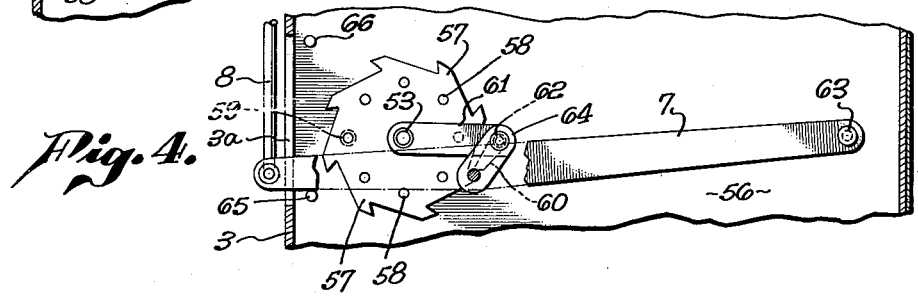
Figure 5:
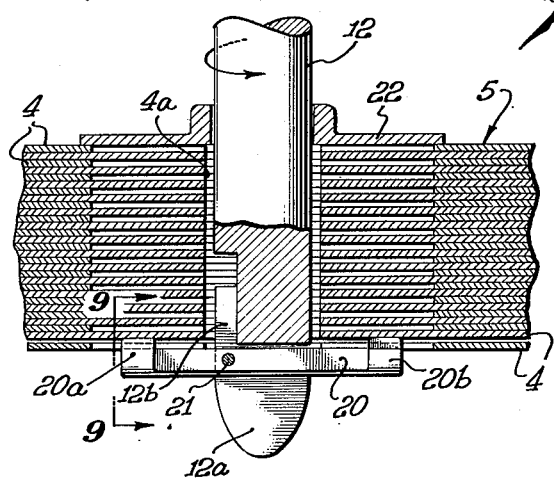
Figure 6:
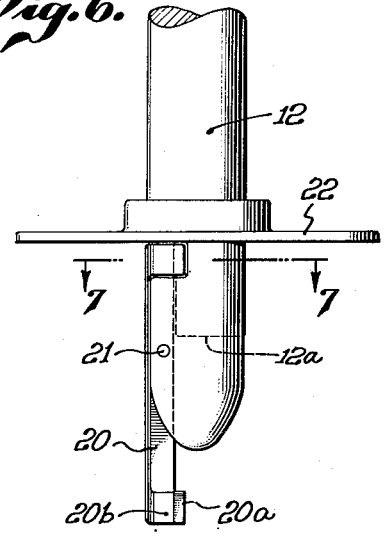
Figure 7:
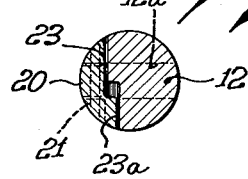

Figure 3 is a fragmentary cross section taken substantially as indicated by line 3—3 of Figure 2;

Figure 4 is a view similar to Figure 3, showing a different operating position of the parts;

Figure 5 is a detail vertical section taken substantially as indicated by line 5—5 of Figure 2;

Figure 6 is a detail elevation showing the parts of Figure 5 in a position to receive the book of sheets;

Figure 7 is a cross section taken as indicated by line 7—7 of Figure 6;

Figure 8 is a bottom plan view, on an enlarged scale, of the slip sheet book and support means, taken as indicated by line 8—8 of Figure 1;

Figure 9 is a fragmentary section, taken as indicated by line 9—9 of Figure 5;

Figures 10 and 11 are views similar to Figure 9, showing successive operating positions assumed by the supporting finger;

Figure 12 is a view similar to Figure 8, but with the supporting finger in position illustrated in Figure 10;

Figure 13 is a similar view showing another operating position of the supporting finger;

Figure 14 is a vertical section similar to Figure 5, but showing a modified form of the invention;

Figure 15 is a fragmentary transverse section taken as indicated by line 15—15 on Figure 14;

Figure 16 is a cross section on an enlarged scale taken as indicated by line 16—16 on Figure 14;

Figure 17 is a view similar to Figure 14, but illustrating the loading operation; and Figure 18 is a view similar to Figure 3 but showing the operating mechanism arranged for the modified form of Figure 14.

Referring to that form of the invention shown in Figures 1 to 13 of the drawings, the slip sheet apparatus is indicated generally by the numeral 1, and is shown in Figure 1 as arranged for use with a conventional mimeograph or duplicating machine 2, shown by broken lines. The apparatus 1 comprises a base 3 providing a table surface for the reception of the mimeographed pages from the mimeograph 2. A plurality of sheets or leaves 4 of suitable absorbent material, for example light cardboard, are supported above the table 3 for release successively to drop on each page after it has been delivered by the mimeograph. The sheets 4 are maintained assembled in a group or what is known in the art as a book, 5, by means of a wire loop or staple 6 accommodated in suitable openings 6-a in each sheet (Figure 8). The openings 6-a are of such size that the sheets are freely slidable along the loop 6, which is of such length that the sheets 4 may drop to the table 3.

The means for releasing the sheets 4 includes an operating lever 7. This lever 7 may be operated manually in a manner to release the sheets 4 at appropriate intervals, or it may be arranged to be driven automatically by the duplicating machine 2. For example, as shown in Figure 1, an arm 9 may be pivotally supported at 9–a on the frame of the duplicating machine 2 for movement about its pivot by an eccentric 9–b usually provided for operating the paper feed mechanism of the machine 2. A link or connecting rod 8 serves to connect the lever 7 to the free end of the arm 9. In this way an absorbent sheet 4 is released each time a freshly printed page is delivered by the machine 2.

It is of course necessary that the release of the sheets 4 be timed to occur properly with respect to the delivery of the printed pages. With some types of duplicating machines, proper synchronization is obtained by arranging that the apparatus 1 release a sheet 4 in response to a pushing movement on the link 8, as indicated by the arrow in Figures 1 and 3, and the apparatus shown in Figures 1 to 13 is of this type. With other types of duplicating machines, proper synchronization may require that the sheets 4 be released in response to a pull on the link 8. This merely requires that all rotating parts in the apparatus now to be described be arranged to rotate in the opposite direction from that shown. Furthermore, the modified form of Figures 14 to 18 is arranged to operate in this manner, that is, to release sheets in response to a pull on the link 8, but either form can be constructed for operation in either direction.

As a means of supporting the sheets 4, the base 3 is provided with a vertical post 10 extending upwardly past one side of the book 5 and having an arm 11 overhanging the book 5. The sheets 4 prior to their release are suspended from the arm 11 by a depending member 12 rotatably supported adjacent the free end of the arm 11 by means of ball bearing elements 13 carried in a suitable race 14 formed on the upper side of arm 11 and engaging a shoulder 15 formed on the member 12 (see Figure 2).

The lower end of the member 12 is provided with a diametrical slot 12–a and has a finger 20 pivoted therein by means of a pin 21 to extend in opposite directions transversely thereof to support the sheets 4, as shown in Figure 5. As shown in Figure 8, the sheets 4 each have a central aperture 4–a to accommodate the member 12, the finger 20 normally extending transversely below the aperture 4–a.

To permit the placing of the sheets on the member 12, the finger 20 is adapted to be swung to a vertical position in an upward extension 12–b of the slot 12–a, from which it projects but slightly beyond the surface of the member 12, as shown in Figures 6 and 7. To maintain the sheets 4 against undesirable looseness and to urge them into cooperative relation with the finger 20, a weight 22, which may conveniently be a metal washer, is freely slidable on the member 12. As shown in Figure 6, the finger 20 when in load receiving position projects just enough from the member 12 to keep the weight 22 from dropping off.

As shown in Figure 8, the opening 4–a is intersected by a slot 4–b adapted upon appropriate movement of the finger 20 into alignment therewith to permit the sheet to pass over the finger. In order to drop but one sheet at a time the slots in successive sheets are angularly misaligned, and the member 12 is moved to advance progressively the finger 20 by corresponding increments. Thus, in Figure 8 every other sheet has a slot 4–b, while the alternate sheets have slots at right angles thereto, as indicated by 4–c, the finger 20 accordingly being arranged to advance by 90° increments.

It is desirable to provide means for positively separating the lower sheet from the balance of the book 5 and to accelerate its initial downward movement when released, in order to increase the speed of operation of the apparatus. This is necessary particularly since there is often a slight vacuum between the sheets, causing the released sheet to adhere to the other sheets, and further since the large surface of the sheet and its light weight causes it to fall rather slowly.

For this purpose, the opposite ends of the finger 20 are formed with oppositely directed lateral extensions 20–A forming surfaces 23–a which are spaced above the surface 23 of the finger by a distance somewhat greater than the thickness of a single sheet 4 (see Figure 9). Thus, as the finger 20 moves into alignment with the slot, the lowermost sheet drops to surface 23, the remaining sheets being supported above it and free therefrom on surfaces 23–a.

To impart a snap action to the sheet 4 to accelerate it downwardly upon release, the finger 20 has additional extensions 20–b opposite extensions 20–a and whose upper surface is flush with the face 23 of the finger. The ends of the finger are thus wider than the slot, as shown for example in Figures 10 and 12. Furthermore, the bottom surface 24 of the finger is inclined upwardly to intersect the surface 23–a and form an advancing edge 25 adapted to enter the space between the lowermost sheet 40 and the sheet 41 next above as shown in Figure 10.

In Figures 1, 2, 5 and 8 the finger 20 is shown in what may be termed conveniently a normal position, that is the position it occupies after releasing one sheet 4 and before starting to release the next sheet. As will appear presently, there is another normal position (Figure 13) at right angles thereto. In the position Figures 5 and 8, the lugs 20–a extend through the slot 4–b of the bottom sheet 4, this sheet resting on the finger surface 23, the sheets thereabove being supported independently of the lowest sheet, on the surface 23–a (see Figure 9).

As the finger 20 is advanced to the right (Figure 9), or clockwise (Figure 8) by the operating lever 7, the edge 25 enters between the sheet 40 and the sheet 41 thereabove and deflects that portion of the sheet 40 adjacent the slot 4–b slightly downwardly, since the sheet 40 is still supported on the surface 23 (see Figure 10). Continued movement of the finger 20 causes the trailing edge of the surface 23 to pass into the slot 4–b, so that the sheet 40 is no longer supported and consequently is released, to drop by gravity. In this way the lower sheet is positively separated from the remaining sheets and the slight twist or deflection imparted to the sheet 40 by the finger just prior to release, causes the sheet to snap downwardly when released from the surface 23, thus accelerating its downward movement.

After releasing the sheet 40, the finger continues to move with the sheet 41 supported on surface 23–a (see Figure 11) until extensions 20–a enter the slot 4–c in sheet 41 (see Figure 13), when the sheet 41 drops to surface 23 and the sheet 42 thereabove rests on the surface 23–a. Movement of the finger 20 now ceases, the finger 20 being in its other normal position previously mentioned, and all parts are ready for another cycle of operations. In this way a sheet is positioned or conditioned for delivery by arrival of the finger 20 at its normal position, and is released or delivered thereafter by advance of the finger 20 from its normal position.

To restrain angular movement of the sheets 4 with the member 12, a depending guide pin 30 is provided in the arm 11 for engaging an opening 31 in the sheets 4. This guide 30 extends only a short distance below the height at which the finger 20 is located, so that the sheets fall free of the guide soon after release as it is important that they not be retarded.

The loop 6 is not relied on to position the sheets 4 for cooperation with the finger 20, the opening 6–a being of such size as to insure that the sheets are not retarded by engagement with the binder, and hence being incapable of maintaining the sheets positioned with the required accuracy. The binder loop 6 merely serves to maintain the sheets 4 assembled in a convenient group or book 5 and to facilitate their removal when desired from between the printed pages.

In addition to the previously mentioned apertures in the sheets 4, additional apertures, as 4–d, Figure 8, may be provided to reduce the resistance as the sheet drops. Similarly, the corners may be removed as indicated at 4–e.

The mechanism by which movement of the operating lever 7 imparts angular advance to the member 12 and finger 20 will now be described. A sprocket 50 is secured on the member 12 to rotate therewith, within the hollow arm 11, and is connected by a drive chain 51 with a sprocket 52 secured on a vertical shaft 53 rotatably supported within the post 10 as by bearing structures 54 and 55 respectively adjacent opposite ends of the shaft 53. The base 3 defines a covered space 56 for accommodating the lever 7 and into which the shaft 53 extends (see Figure 2).

A ratchet wheel 57 is secured on the shaft 53 within the space 56 and has a plurality of depressions 58 on its upper face for cooperation with a spring pressed ball or detent 59, which by engagement with a recess 58 serves to releasably position and restrain the shaft 53 against rotation. A pawl 60 for the ratchet wheel 57 is pivoted at the outer end of a lever 61 which is mounted on the lower end of the shaft 53 for free angular movement with respect thereto. A light spring indicated at 62 serves to urge the pawl 60 to engage the wheel 57.

The operating lever 7 is pivotally mounted in the space 56 at its inner end on a threaded post 63 projecting downwardly through the base 3, and projects out of the base through a slot 3–a for connection to the operating link 8. Intermediate its ends, the lever is pivoted to one end of a link 64, the other end of which is connected to the free end of the lever 61. Thus, as the lever 7 is moved downwardly from the position shown in Figure 3 to that showin in Figure 4, the pawl 60 by engagement with one of the teeth on the wheel 57 advances the wheel in a clockwise direction through an angle corresponding to that separating adjacent depressions 58. Thus, the detent 59 is forced out of engagement with one depression 58, riding on the upper face of the wheel 57 until the advance of the wheel is completed when it drops into the next depression 58. This serves to accurately determine the angular position of the shaft 53 and particularly that of the finger 20 which is controlled thereby, as well as to prevent reverse rotation when the lever 7 is returned to its initial position. Thus, upon return movement of the lever 7, the pawl 60 rides over the next tooth on the wheel 57 and into engagement therewith, readying the parts for another cycle of operations. Stop pins 65 and 66 may be provided for appropriately limiting the angular movement of the arm 7. The arrangement is such that angular movement of the shaft 53 in an amount equal to the angular spacing of the detent depressions 58 will advance the finger 20 by an amount equal to the angular misalignment of the slots 4–b and 4–c in the adjacent sheets 4.

The operation of the apparatus may now be discussed. The slip sheets 4 having been previously assembled in a book 5, on the loop 6, the finger 20 is turned about its pin 21 to extend vertically, as shown in Figure 6, and the sheets 4 are slipped over the finger and the member 12 to engage the weight 22. The sheets 4 and the weight 22 are pushed upwardly until the finger 20 is cleared, when the finger 20 is returned to its horizontal position, and the sheets 4 allowed to rest thereon, as shown in Figure 5. The loop 6 is of such length as to rest on the base and is positioned to extend generally vertically. As previously mentioned, the loop 6 is primarily for the purpose of maintaining the sheets 4 in a book or group 5, but it does serve to limit horizontal displacement lengthwise of the sheets, as the sheets are dropped. Furthermore, a plate 68 is provided on the base 3 to cooperate with the post 10 to locate the sheets transversely as they fall to the base. Operation of the lever 7 to advance the finger 20 in a step by step manner will then release successive sheets 4 as previously explained.

In Figures 14 to 16 a modified form of support for the book 5 of sheets 4 is shown, including a finger member 70 which supports and releases the sheets in the manner previously discussed, but which is arranged to facilitate the loading of the sheets on the support.

As shown in Figures 14 and 17, the finger member 70 is formed of a pair of identical elements 71 and 72 normally projecting oppositely from the depending member 73 and mounted in a through slot 73–a therein for independent pivotal movement, by pins 74 and 75. The upper surface of the slot 73–a provides a surface 73–b adapted to be engaged by the inner ends of the finger elements 71 and 72 to limit downward movement of the finger elements and maintain them in sheet supporting position (see Figure 14). The slot 73–a has opposite, upward extensions 73–c and 73–d to permit the finger elements 71 and 72 to swing upwardly to a position in which they will freely enter the apertures 4–a in the sheets 4 (see Figure 17). Thus, when it is desired to place a book 5 on the member 73, it is only necessary to align the apertures 4–a with the member 73, and pass the sheets upwardly over the member 73, the fingers 71 and 72 being lifted to a position in which they will clear the apertures. The book 5 is passed upwardly to a point above the fingers 71 and 72, allowing them to drop to the positions of Figure 14, when the book 5 may be lowered to rest on the fingers.

To insure against the possibility of the fingers 71 and 72 remaining in their lifted positions after the upward passage of the sheets 4 pass them, small leaf springs 76 and 77 are secured at the bottom of each slot extension 73–c and 73–d, as by a rivet 78. These springs 76 and 77, by engagement with the fingers 71 and 72 respectively, urge the fingers outwardly about their pivots 14 and 75.

As in the previously described finger, lateral extensions are provided at the outer ends of the finger member 70, by extensions 71-a and 72-a on the finger elements 71 and 72, these extensions providing surfaces 80-a and 81-a spaced above the finger surfaces 80 and 81 by a distance slightly greater than that of a single sheet 4 (see Figures 14 and 15). Each finger 71 and 72 also has an extension 71-b and 72-b opposite extensions 71-a and 72-a and having a surface flush with surfaces 80 and 81. Thus, the finger member 70 when supporting a book 5 of sheets 4, serves in response to rotation of the member 70, to separate the sheets one at a time from the book 5 and release and accelerate them downwardly in the same manner as before.

However, as clearly shown in Figures 14 and 15, the raised surfaces are so positioned that separation and release of the sheets 4 occurs in response to rotation of the member in a counter-clockwise direction looking upwardly from the bottom of the member 73. To obtain such counter-clockwise rotation it is only necessary to reverse the pawl and ratchet mechanism. This can be done readily by turning the ratchet wheel 57 other side up from the position shown in Figure 3 and positioning the pawl 60 on the other side of the operating lever 7. Such positioning of the parts is shown in Figure 18. Under these conditions the apparatus 1 is caused to deliver a sheet in response to a pull on the connecting rod 8.

I claim:

1. In a slip sheeting apparatus, a support for a book of slip sheets, comprising means providing a pair of vertically spaced upwardly facing surfaces of limited area, successive sheets of said book having angularly misaligned openings, the means providing the upper of said surfaces being adapted to extend through the opening in the bottom sheet to support the sheets thereabove, the bottom sheet resting on the other surface, and means for releasing the bottom sheet.

2. In a slip sheeting apparatus, a depending movable member carrying a projecting finger having a stepped surface for supporting a book of slip sheets with the lower sheet spaced therebelow, successive sheets having angularly misaligned slots, each slot being adapted to pass the finger upon alignment of the finger with the slot, said finger having a tapered advancing edge for positively separating said lower sheet from the book in response to movement of said member.

3. In a slip sheeting apparatus, a depending movable member carrying a projecting finger providing a stepped supporting surface for supporting a book of slip sheets, each of said sheets having a slot capable of passing said finger upon alignment of said finger and said slot, the slots in successive sheets being misaligned, the upper of said surfaces having a width substantially less than that of the slot whereby in response to movement of the finger to enter the slot freely and release the lower sheet for support on the lower surface, the total width of said stepped surface exceeding the width of said slot, means restraining movement of the sheets with said member, said finger having an advancing edge and a downwardly decreasing width whereby advance of the finger urges that portion of the sheet adjacent the forward edge of the slot downwardly while that portion of the sheet adjacent the rear edge of the slot is still supported to distort the sheet, further movement of the finger serving to release the sheet and allow it to snap downward to relieve the distortion.

4. In a slip sheeting apparatus, a finger providing a pair of stepped upwardly facing supporting surfaces, means mounting said finger for advancing movement, the bottom of said finger being substantially narrower than said surfaces to provide a tapered advancing edge, said finger being adapted to support a slotted slip sheet on the lower of said surfaces, means for advancing said finger, means restraining said sheet against movement with said finger, the width of said slot being less than the width of said surfaces, whereby advancing movement of said finger causes said advancing edge to flex the sheet downwardly before the sheet is released by said lower surface, and subsequently causes said lower surface to release the sheet.

RICHARD W. BAILEY.

REFERENCES CITED

The following references are of record in the file of this patent:

UNITED STATES PATENTS

| Number | Name | Date |
| --- | --- | --- |
| 1,627,417 | Shinn | May 3, 1927 |
| 1,682,699 | Brasseur | Aug. 28, 1928 |
| 1,972,070 | Jacobsen et al. | Aug. 28, 1934 |
| 2,139,132 | Nigra | Dec. 6, 1938 |
| 2,142,504 | Ford | Jan. 3, 1939 |
| 2,196,506 | Nigra | Apr. 9, 1940 |